Figure 1:
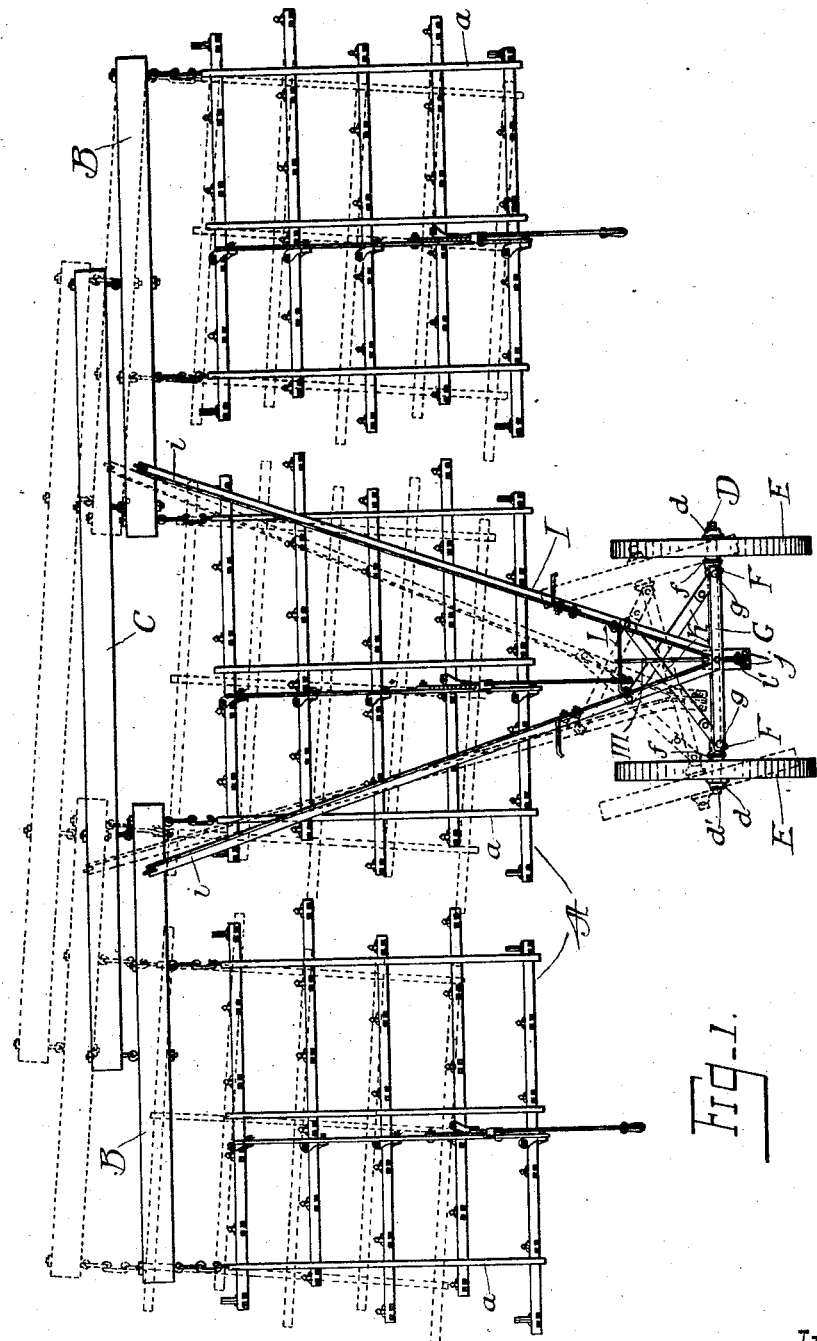

No. 861,196. PATENTED JULY 23, 1907.
C. S. SHARP.
SULKY ATTACHMENT FOR HARROWS.
APPLICATION FILED MAY 1, 1907.

2 SHEETS—SHEET 1.

WITNESSES.

INVENTOR.
Charles S. Sharp
By
ATTORNEY.

No. 861,196. PATENTED JULY 23, 1907.
C. S. SHARP.
SULKY ATTACHMENT FOR HARROWS.
APPLICATION FILED MAY 1, 1907.
2 SHEETS—SHEET 2.
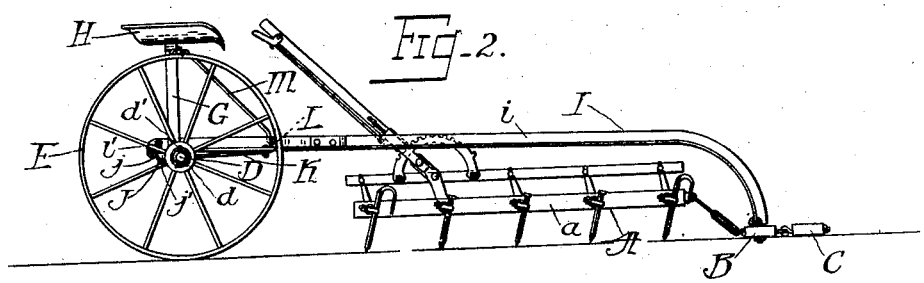
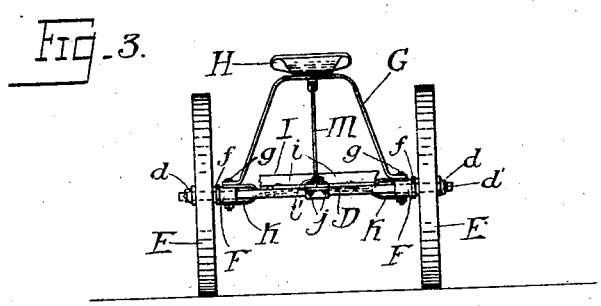
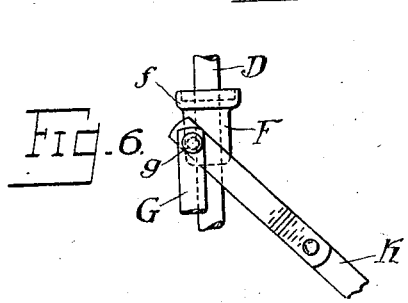
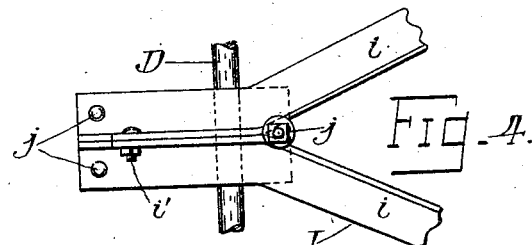
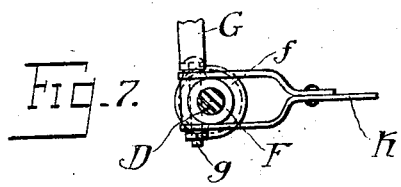
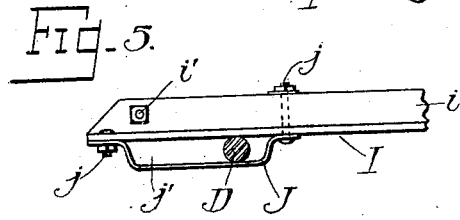
WITNESSES
F. W. Hoffmeister.
T. N. Daggett.
INVENTOR
Charles S. Sharp
By J. C. Warnes,
ATTORNEY
THE NORRIS PETERS CO., WASHINGTON, D. C.

UNITED STATES PATENT OFFICE.

CHARLES S. SHARP, OF AUBURN, NEW YORK, ASSIGNOR TO INTERNATIONAL HARVESTER COMPANY, A NEW JERSEY CORPORATION.

SULKY ATTACHMENT FOR HARROWS.

No. 861,196.      Specification of Letters Patent.      Patented July 23, 1907.

Application filed May 1, 1907. Serial No. 371,250.

*To all whom it may concern:*

Be it known that I, CHARLES S. SHARP, a citizen of the United States, residing at Auburn, in the county of Cayuga and State of New York, have invented a new and useful Improvement in Sulky Attachments for Harrows, of which the following is a complete specification.

This invention relates to riding attachments for harrows, or other like agricultural implements, in which it is frequently desirable to afford the operator relief from the fatigue of walking.

The object in view is to provide a structure easily manufactured, simple in design and effective in its operation.

Referring to the accompanying drawings—

Figure 1 represents a plan of a harrow with the improved sulky attachment in connection therewith. Fig. 2 is a side elevation of the harrow and attachment shown in Fig. 1. Fig. 3 is a rear elevation of the sulky attachment alone, the forward ends of the diverging reach members being shown cut away. Figs. 4 and 5 are details showing a plan and elevation, respectively, of the rear end of the reach and its connection with the axle; and Figs 6 and 7 are details showing a plan and elevation, respectively, of the connection of the rear end of the crossed bars with the axle.

The harrow A, in connection with which the improvement is shown, is formed of the three sections $a$ and is of the peg tooth type. To the forward corners of each of the side sections, and the adjacent front corner of the central section, is secured a draft lever B, to which is suitably connected the equalizing bar C.

The sulky attachment consists of the axle D, on which journal the supporting wheels E. Each wheel is held in place on the axle on the outside by the notched washer $d$ and pin $d^1$, and on the inside by the flanged collar F, which is fixed thereto, the flange $f$ thereon serving as a sand box for the wheel. An upwardly extending bent bar G, secured at its ends to the collars F by means of the bolts $g$, forms a seat support, on which is mounted the operator's seat H. A reach I connects the axle D with the draft devices of the harrow. This reach is preferably V-shaped, the members $i$ thereof being formed of angle bars, which are made to diverge forwardly, turn down at their front ends and connect with the draft levers B. The rear end of the reach connects with the sulky axle in the following manner: The members $i$ forming the reach are bent to parallel each other at their rear ends, and are secured together by means of the bolt $i^1$. To the under side of this end portion is clamped, by means of the bolts $j$, the bent strap J, which forms a loop $j^1$. This loop engages the axle D, and hence makes a transversely movable connection between the rear end of the reach I and the axle. To connect the reach and axle crossed bars K pivotally connect with the axle D near its ends, the connection being made preferably to the collars F by means of the bolts $g$. These crossed bars extend forwardly and obliquely, and pivotally connect each with the opposite reach member, as shown. The essential requirement is that the bars K shall cross and connect with the reach bar at a point laterally disposed from its central longitudinal axis, and on the side opposite to the connection of its rear end with the axle. This arrangement will cause the sulky attachment to readily turn and follow the rear end of the reach when the harrow turns a corner. In turning the rear end of the reach will move laterally in the loop $j^1$ along the axle D. A strut L extends transversely between the members $i$ of the reach I at a position closely adjacent to the pivotal connection of the forward end of the crossed bars K with said reach members, and a brace M extends between the middle of this strut and the top of the seat support G. Such arrangement of the strut and brace will produce a minimum rocking movement of the seat H when the harrow is turning.

What I claim as my invention, and desire to secure by Letters Patent, is:

1. In a sulky attachment for harrows, in combination, an axle, supporting wheels journaled thereon, a reach having at its rear end a transversely sliding connection with said axle, obliquely and forwardly extending crossed bars pivoted at their rear ends near the ends of the axle and at their forward ends to opposite laterally disposed points on said reach, and a seat mounted on said axle.

2. In a sulky attachment for harrows, in combination, an axle, supporting wheels journaled thereon, a V-shaped reach, the members of which diverge forwardly and have a sliding connection at their rear ends with said axle, obliquely and forwardly extending crossed bars pivoted at their rear ends near the ends of the axle and at their forward ends to the opposite reach member, and a seat mounted on said axle.

3. In a sulky attachment for harrows, in combination, an axle, supporting wheels journaled thereon, a V-shaped reach comprised of two members fixed together at their rear ends and diverging forwardly, said reach being held at its rear end against vertical movement by the said axle but free to slide laterally thereon, obliquely and forwardly extending crossed bars pivoted at their rear ends near the ends of the axle and at their forward ends to the opposite reach member, and a seat mounted upon said axle.

4. In a sulky attachment for harrows, in combination, an axle, wheels journaled thereon, an arched seat support fixed to and extending upwardly from said axle, a seat mounted thereon, a V-shaped reach, the members thereof diverging forwardly and being secured together at their rear ends, a strap iron fixed to and arranged to form a loop on the rear end of said reach, which loop engages and permits of lateral movement of the rear end of the reach on said axle, and obliquely and forwardly extending crossed bars pivoted at their rear ends near the ends of the axle and at their forward ends to the opposite reach member.

5. In a sulky attachment for harrows, in combination, an axle, supporting wheels journaled thereon, an upwardly extending arch-shaped seat support fixed to said axle, a seat mounted on said support, a V-shaped reach, the members thereof diverging forwardly and being secured together at their rear ends, obliquely and forwardly extending crossed bars pivoted at their rear ends to the ends of said axle and at their forward ends to the opposite reach member, a transversely extending strut connecting the reach members adjacent to the pivotal connection of the crossed bars therewith, and a brace interposed between said strut and the seat support.

CHARLES S. SHARP.

Witnesses:
K. T. ELLIOTT,
F. T. O'BRIEN.